United States Patent
Simon et al.

(10) Patent No.: US 9,765,871 B2
(45) Date of Patent: Sep. 19, 2017

(54) TURBINE ASSEMBLY AND METHOD FOR A THRUST WASHER INSTALLATION ON A TURBINE OF A TORQUE CONVERTER

(71) Applicant: Schaeffler Technologies GmbH & Co. KG, Herzogenaurach (DE)

(72) Inventors: Timothy Simon, Wooster, OH (US); Matthew Smith, Wooster, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 299 days.

(21) Appl. No.: 14/573,951

(22) Filed: Dec. 17, 2014

(65) Prior Publication Data

US 2015/0167809 A1 Jun. 18, 2015

Related U.S. Application Data

(60) Provisional application No. 61/917,416, filed on Dec. 18, 2013.

(51) Int. Cl.
*F16H 41/24* (2006.01)
*F16H 45/02* (2006.01)

(52) U.S. Cl.
CPC .......... *F16H 41/24* (2013.01); *F16H 45/02* (2013.01); *Y10T 29/4933* (2015.01)

(58) Field of Classification Search
CPC .......... F16H 41/24; F16H 45/02; F16C 17/04
USPC ................. 415/107; 384/428, 440
See application file for complete search history.

(56) References Cited

U.S. PATENT DOCUMENTS

| | | | | |
|---|---|---|---|---|
| 3,597,027 A * | 8/1971 | Herndon | ............... | F16C 17/04 384/305 |
| 4,293,170 A * | 10/1981 | Brezosky | ............ | H02K 5/1672 384/275 |
| 5,007,746 A * | 4/1991 | Matzelle | ................ | F16C 35/02 384/420 |
| 5,139,350 A * | 8/1992 | Gieseler | ................ | F16C 17/04 384/295 |
| 5,277,500 A * | 1/1994 | Keck | .................... | F16C 23/045 310/90 |
| 5,846,001 A * | 12/1998 | Muntnich | ............... | F16C 19/30 384/620 |
| 6,273,685 B1 * | 8/2001 | Kuhn | .................... | F04B 1/0404 384/298 |
| 6,533,461 B2 * | 3/2003 | Gottlieb | ................. | F16C 19/30 384/255 |
| 8,439,567 B1 * | 5/2013 | Armentrout | ........... | F16C 17/04 384/122 |
| 2011/0135228 A1 * | 6/2011 | Kaneko | ............... | B60G 15/068 384/420 |

(Continued)

*Primary Examiner* — Dwayne J White
*Assistant Examiner* — Aaron R Eastman
(74) *Attorney, Agent, or Firm* — Davidson, Davidson & Kappel, LLC

(57) ABSTRACT

A turbine assembly for a torque converter is provided. The turbine assembly includes a turbine including a plurality of holes and a thrust washer connected to the turbine. The thrust washer includes a bearing ring, at least one retaining post axially protruding from the bearing ring through at least one of the holes and at least one support post axially protruding from the bearing ring through at least one of the holes. The or each retaining post includes an outwardly radially protruding clip securing the thrust washer onto the turbine. A method for forming a turbine assembly is also provided.

16 Claims, 5 Drawing Sheets

(56) References Cited

U.S. PATENT DOCUMENTS

2013/0125538 A1* 5/2013 Frey .................. F16C 33/02
60/330

* cited by examiner

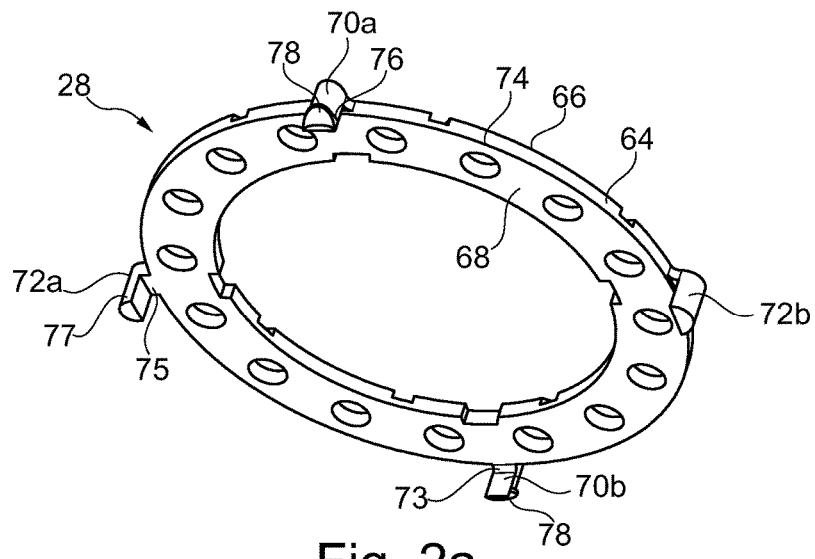
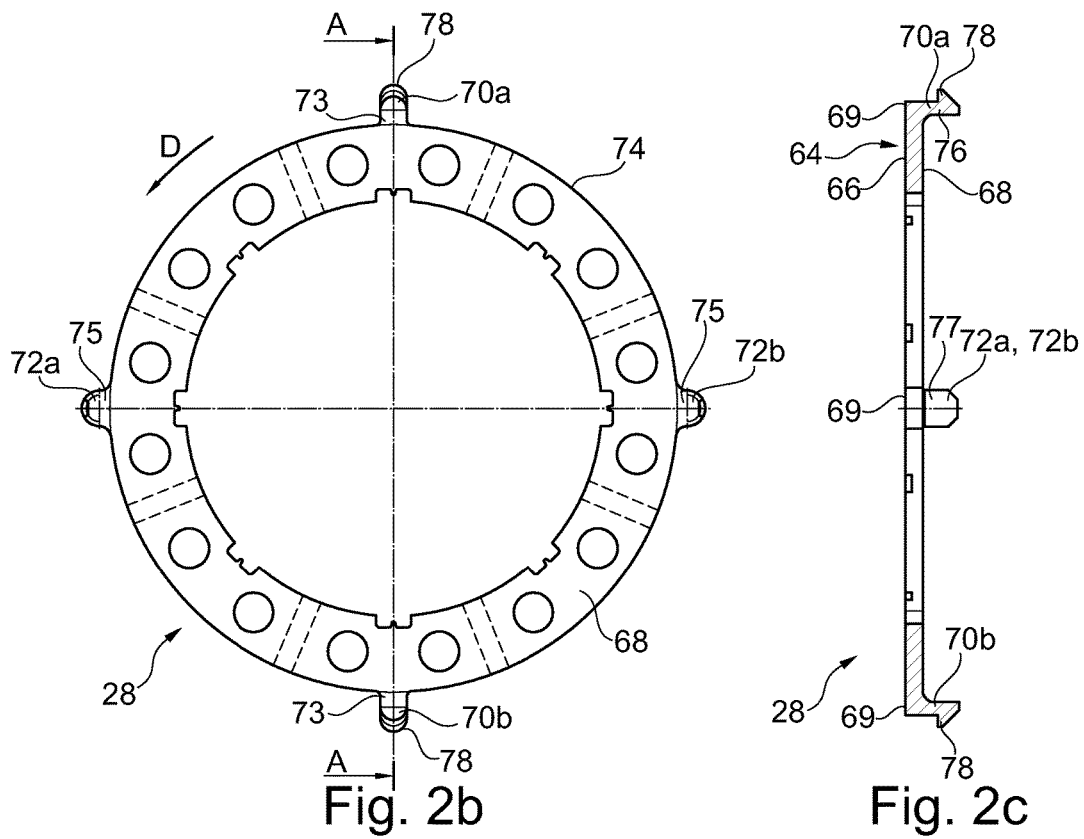
Fig. 2a
Fig. 2b
Fig. 2c

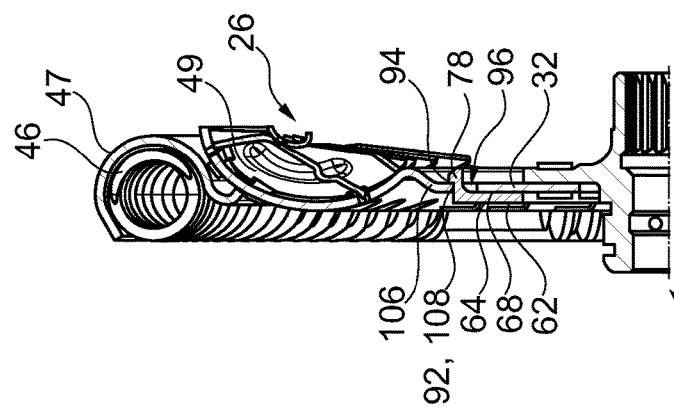
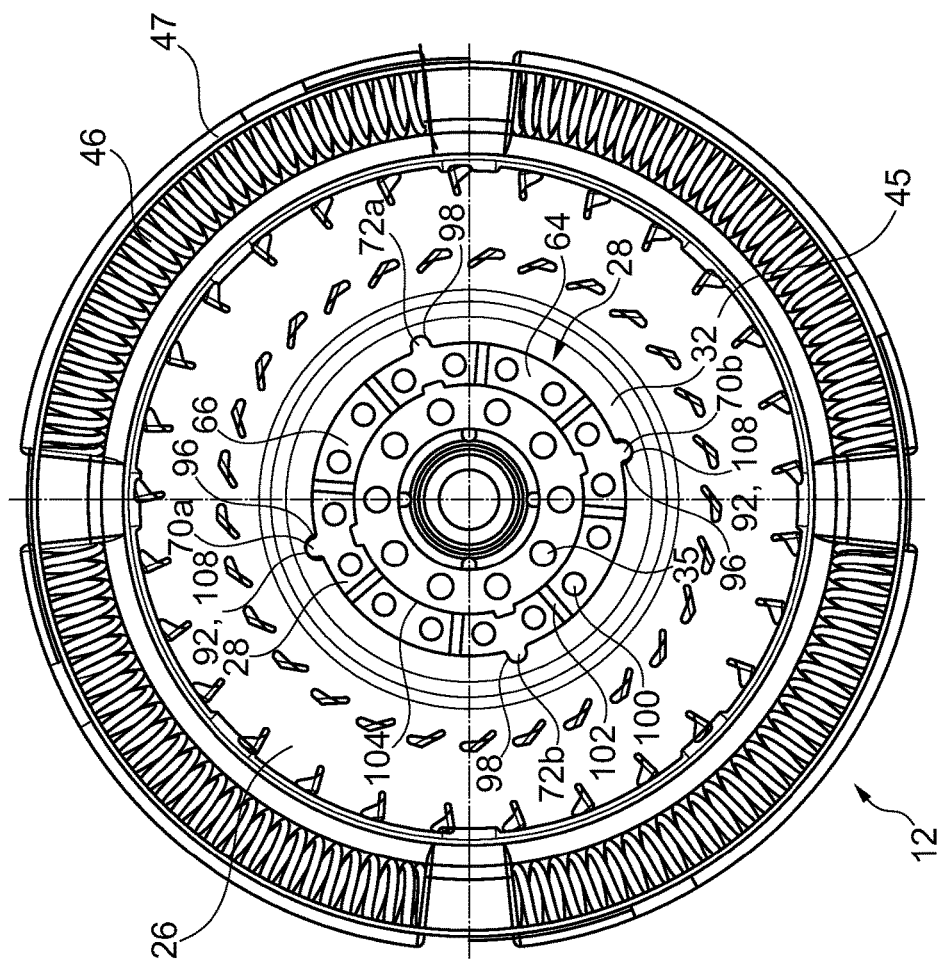
Fig. 5a
Fig. 5b

TURBINE ASSEMBLY AND METHOD FOR A THRUST WASHER INSTALLATION ON A TURBINE OF A TORQUE CONVERTER

This claims the benefit to U.S. Provisional Patent Application No. 61/917,416, filed on Dec. 18, 2013, which is hereby incorporated by reference herein.

The present disclosure relates generally to torque converters and more specifically to thrust washers installed on turbines in torque converters.

BACKGROUND

Currently available solutions for thrust washer retention are an outer diameter clip, twist and lock feature, side clips, or other more complicated clip geometries.

SUMMARY OF THE INVENTION

A turbine assembly for a torque converter is provided. The turbine assembly includes a turbine including a plurality of holes and a thrust washer connected to the turbine. The thrust washer includes a bearing ring, at least one retaining post axially protruding from the bearing ring through at least one of the holes and at least one support post axially protruding from the bearing ring through at least one of the holes. The or each retaining post includes an outwardly radially protruding clip securing the thrust washer onto the turbine.

A method of forming a thrust washer assembly for a torque converter is also provided. The method includes clipping a thrust washer onto a turbine. The thrust washer includes a bearing ring, at least one retaining post axially protruding from the bearing ring and at least one support post axially protruding from the bearing ring. The or each retaining post includes an outwardly radially protruding clip. The clipping includes moving the at least one support post through corresponding holes in the turbine toward an assembly surface such that the at least one support post axially contacts the assembly surface while the at least one retaining post remains axially movable with respect to the assembly surface, then forcing the or each clip radially inward such that the or each clip clips the thrust washer onto the turbine.

BRIEF DESCRIPTION OF THE DRAWINGS

The present invention is described below by reference to the following drawings, in which:

FIGS. 2a to 2c show different views of a thrust washer in accordance with an embodiment of the prevent invention;

FIG. 3b shows a cross-sectional side view of the support post along B-B shown in FIG. 3a;

FIG. 4b shows a cross-sectional side view of the retaining post along C-C shown in FIG. 4a;

FIG. 5a shows a plan view of a turbine assembly in accordance with an embodiment of the present invention;

FIG. 5b shows a cross-sectional side view of the turbine assembly shown in FIG. 5a;

DETAILED DESCRIPTION

The present disclosure provides a thrust washer with radially outward extending clips for retaining the thrust washer in turbine shell holes. In order to ease assembly issues caused by deflection of the clips when the bearing is assembled to the shell, the thrust washer includes a pair of support posts acting as fulcrums during assembly. In one embodiment, the support posts extend below the radial tabs to contact an assembly surface first; in another embodiment, the assembly surface includes protrusions in the form of mating pins extending to the support posts. The thrust washer may be advantageous because it fits into the very small space available for the post and clip features, while maintaining sufficient post thickness to keep from breaking. The maximum post size may be limited on the outer diameter by the stamping capabilities of punch size of the turbine shell bend. The maximum post size may be limited on the inner diameter by an outer diameter of a bearing on the opposite side of the turbine shell as the thrust washer.

Figure 1:
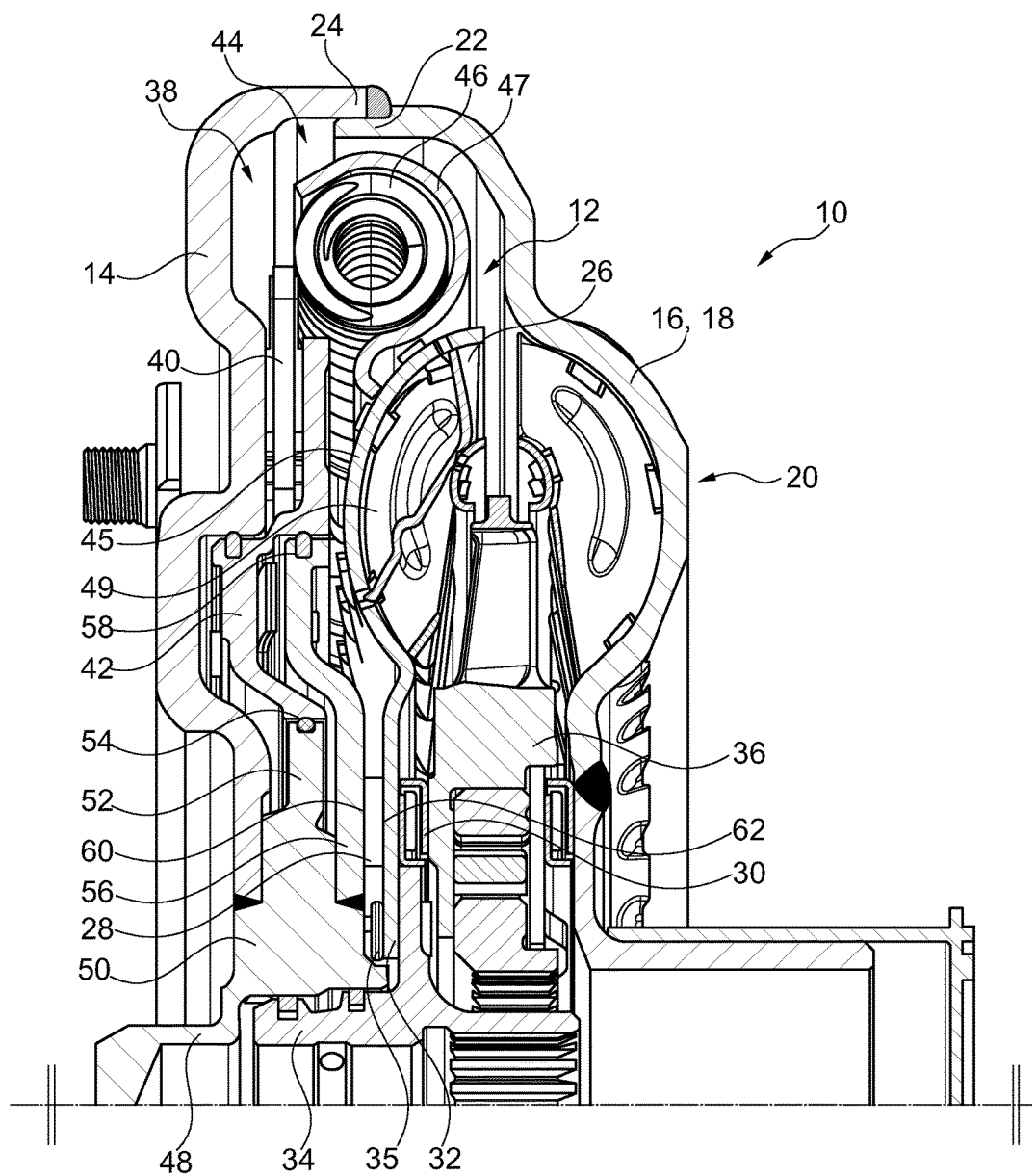
FIG. 1 shows a cross-sectional side view of a torque converter in accordance with an embodiment of the present invention.

FIG. 1 shows a torque converter 10 including a turbine assembly 12 in accordance with an embodiment of the present invention. Torque converter 10 includes a front cover 14 for connecting with a crankshaft of a motor vehicle engine and a rear cover 16 forming a shell 18 of an impeller 20. Front cover 14 and rear cover 16 are both substantially cup shaped and are joined by providing an axial extension 22 of rear cover 16 radially inside of an axial extension 24 of front cover 14. Turbine assembly 12 includes a turbine 26 opposite of impeller 20, a front side thrust washer 28 between turbine 26 and front cover 14 and a rear side bearing 30 between turbine 26 and rear cover 16. A radial inner plate portion 32 of turbine 26 is nonrotatably connected to a turbine hub 34, which is connectable to a downstream drive component, for example a variable-speed transmission, via an inner splined surface. In this embodiment, radial inner plate portion 32 is connected to turbine hub 34 by a plurality of rivets 35. Torque converter 10 also includes a stator 36 positioned axially between impeller 20 and turbine 26. A lockup clutch 38 is positioned between front cover 14 and turbine 26 for engaging front cover 14 to couple turbine 26 and front cover 14 together when impeller 20 and turbine 26 have the same rotational velocity. Lockup clutch 38 includes a clutch plate 40 have friction surfaces on both axial sides thereof and a piston 42. Piston 42 is axially slidable toward and away from front cover 14 by fluid pressure differences within torque converter 10 to engage clutch plate 40 with and disengage clutch plate 40 from front cover 14. A damper 44 is provided between turbine 26 and lockup clutch 34 for connecting turbine 26 to lockup clutch 38 and isolating turbine 26 from the vibrations of the engine when lockup clutch 38 is engaged. Damper 44 includes damping elements in the form of a plurality of circumferentially spaced springs 46 that are connected to a rounded portion 45 of turbine 26, which holds turbine blades 47, by a spring retainer 49.

Thrush washer 28 is positioned between radial inner plate portion 32 and a cover assembly 48 of front cover 14 that slidably supports an inner radial surface of piston 42. Thrust washer 28 absorbs loading between turbine 26 and cover assembly 48. Cover assembly 48 includes an axial front side 50 welded to front cover 14, a first radial extension 52 including a seal 54 for slidably supporting the inner radial surface of piston 42 and a second radial extension 56 including a seal 58 for slidably supporting an intermediate surface of piston 42. Thrust washer 28 is directly between second radial extension 56 of cover assembly 48 and radial inner plate portion 32 of turbine 26. Thrust washer 28 helps prevent wear between an axial surface 60 of cover assembly 48 and an axial surface 62 of turbine 26 during operation when cover assembly 50 and turbine 26 have different rotational velocities.

FIGS. 2a to 2c show different views of thrust washer 28 in accordance with an embodiment of the prevent invention. FIG. 2a shows a perspective view of thrust washer 28, FIG. 2b shows a plan view of thrust washer 28 and FIG. 2c shows a cross-section side view of thrust washer 28 along A-A shown in FIG. 2b. Thrust washer 28 includes a bearing ring 64 including a first axial surface 66 for contacting cover assembly 50 and a second axial surface 68 for contacting turbine 26. Thrust washer 28 also includes two retaining posts 70a, 70b axially protruding from bearing ring 64 and two support posts 72a, 72b axially protruding from bearing ring 64. Retaining posts 70a, 70b retain thrust washer 28 on turbine 26 (FIG. 1) (for example, such retention may be required as turbine assembly 12 is flipped during assembly) and support posts 72a, 72b provide torsional support (for example, support may be required for torque derived from the speed differential between turbine assembly 12 and cover assembly 48 with an axial load). In a preferred embodiment, support posts 72a, 72b have a greater girth than retaining posts 70a, 70b.

In a circumferential direction D, in sequence, first support post 72a, follows first retaining post 70a, second retaining post 70b follows first support post 72a and second support post 72b follows second retaining post 70b. In circumferential direction D, first support post 72a is spaced 90 degrees from first retaining post 70a, second retaining post 70b is spaced 90 degrees from first support post 72a and second support post 72b is spaced 90 degrees from second retaining post 70b.

Retaining posts 70a, 70b each include a base 73 extending radially past an outer circumference 74 of bearing ring 64 and supports posts 72a, 72b similarly each include a base 75 extending radially past outer circumference 74 of bearing ring 64. Bases 73, 75 each include an axial surface 69 coincident with axial surface 66 of the bearing ring in a radially extending plane. Retaining posts 70a, 70b each include an axially protruding portion 76 extending axially from the respective base 73, and supports posts 72a, 72b similarly each include axially protruding portion 77 extending axially from the respective base 75. Retaining posts 70a, 70b each include an outwardly radially protruding clip 78 extending radially away from an outer radial surface of the respective axially protruding portion 76, respectively, for securing thrust washer 28 onto turbine 26.

Figure 3A:
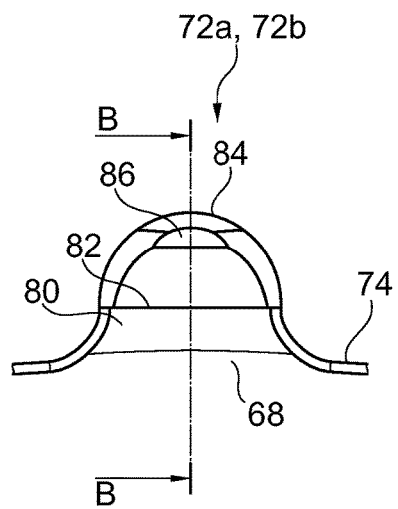
FIG. 3a shows a plan view of a support post of the thrust washer shown in FIGS. 2a to 2c.
Figure 3B:
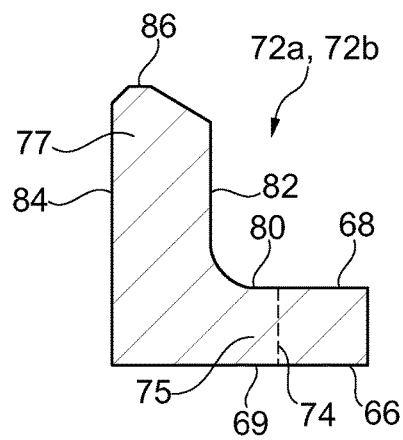

FIG. 3a shows a plan view of one of support posts 72a, 72b shown in FIGS. 2a to 2c and FIG. 3b shows a cross-sectional side view of the post 72a or 72b along B-B shown in FIG. 3a. Support posts 72a, 72b each include base 75 extending radially from outer diameter 74 of bearing ring 64. Base 75 has first axial surface 69, which is coincident with axial surface 66 of ring 64 in a radial plane, for contacting cover assembly 50 and a second axial surface 80, which is coincident with axial surface 68 of ring 64 in a radial plane, for contacting turbine 26. Axially protruding portion 77 extends perpendicular to surface 69 away from base 75 and includes an inner radial surface 82, an outer radial surface 84 and a contact surface 86 at a tip of axially protruding portion 77 for contacting an assembly surface during assembly of thrust washer 28 onto turbine 26. As clearly shown, outer radial surface 84 has a continuous rounded counter and does not include any outer radial protrusions such that support posts 72a, 72b may be slid snugly along outer radial edges of holes 98 (FIGS. 5a, 5b, 6a, 6b).

Figure 4A:
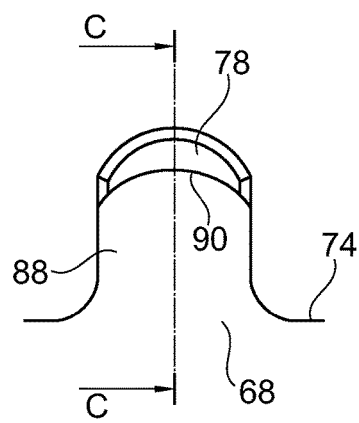
FIG. 4a shows a plan view of a retaining post of the thrust washer shown in FIGS. 2a to 2c.
Figure 4B:
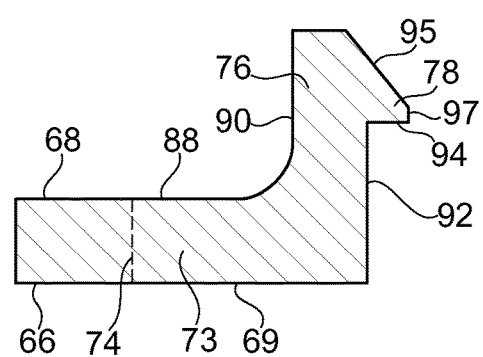

FIG. 4a shows a plan view of one of retaining posts 70a, 70b shown in FIGS. 2a to 2c and FIG. 4b shows a cross-sectional side view of the post 70a or 70b along C-C shown in FIG. 4a. Retaining posts 70a, 70b each include base 73 extending radially from outer diameter 74 of bearing ring 64. Base 73 has first axial surface 69, which is coincident with axial surface 66 of ring 64 in a radial plane, for contacting cover assembly 50 and a second axial surface 88, which is coincident with axial surface 68 of ring 64 in a radial plane, for contacting turbine 26. Axially protruding portion 76 extends perpendicular to surface 69 away from base 73 and includes an inner radial surface 90 and an outer radial surface 92. Clip 78 extends radially outward from axially protruding portion 76 and includes an axial contact surface 94 for contacting an axial surface of turbine 26 for securing thrust washer 28 onto turbine 26. Clip 78 also includes an inclined contact surface 95 for forcing clip 78 radially inward as retaining posts 70a, 70b are pressed into holes 96 (see FIGS. 5a, 5b, 6a, 6b) in turbine 26. Inclined contact surface 95 and axial contact surface 94 meet at a radial outer tip 97 of clip 78.

FIG. 5a shows a plan view of turbine assembly 12 in accordance with an embodiment of the present invention and FIG. 5b shows a cross-sectional side view of turbine assembly 12. Thrust washer 28 is connected to plate portion 32 of turbine 26 by retaining posts 70a, 70b extending axially through respective holes 96 in plate portion 32. Support posts 72a, 72b also extend axially through respective holes 98 in plate portion 32 that are radially aligned with holes 96. Bearing ring 64 may include a plurality of holes 100 circumferentially spaced from each other therein and plurality of radially extending fluid flow grooves 102 extending between outer circumference 74 and an inner circumference 104 thereof. Radially inside of thrust washer 28, turbine 26 includes a plurality of holes for receiving rivets 35.

As shown in FIG. 5b, in order to connect thrust washer 28 to turbine 26, clips 78 extend past an axial surface 106 of plate portion 32, which is on an opposite side of turbine 26 as axial surface 62 contacted by axial surface 68 of bearing ring 64, such that axial contact surface 94 contacts axial surface 106. Each hole 96 is in part defined by a radial outer edge 108 that is contacted by radial outer surface 92 of the respective retaining post 70a, 70b. Once thrust washer 28 is installed on turbine 26, inner radial surface 90 is adjacent to and may be slightly contacting an outer radial surface of bearing 30.

Figure 6A:
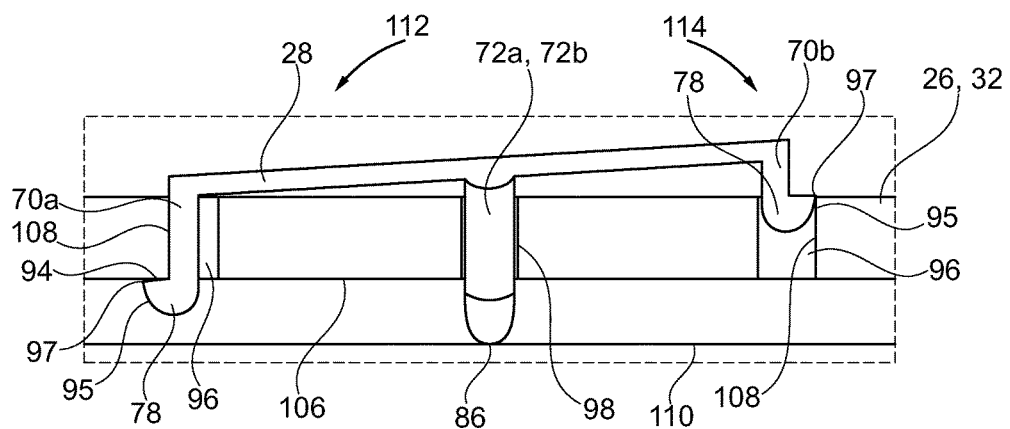
FIG. 6a schematically illustrates a method of connecting a thrust washer to a turbine in accordance with an embodiment of the present invention.

FIG. 6a schematically illustrates a method of connecting thrust washer 28 to turbine 26 in accordance with an embodiment of the present invention. In this embodiment, support posts 72a, 72b have a greater axial length than retaining posts 70a, 70b, which may allow thrust washer 28 to be installed on turbine 26 using a flat assembly surface 110. Assembly surface 110 may be the surface of an installation tool or a fixture. In order to install thrust washer 28 on turbine 26, support posts 72a, 72b are pressed into holes 98 until contact surfaces 86 of support posts 72a, 72b contact assembly surface 110. Retaining posts 70a, 70b of thrust washer 28 are then pivoted about contact surfaces 86 to allow retaining posts 70a, 70b to be installed into holes 96.

First, thrust washer 28 may be tilted or bent in a direction 112 such that clip 78 is forced radially inward and inclined surface 95 of clip 78 on retaining post 70a contacts radial outer edge 108 of hole 96 as retaining post 70a is pressed toward assembly surface 110. Once tip 97 of clip 78 of retaining post 70a contacts radial outer edge 108, tip 97 slides along radial outer edge 108 until clip 78 is passed all the way through hole 96 and clip 78 snaps radially outward, such that axial contact surface 94 of radial post 70a contacts axial surface 106 of plate portion 32 of turbine shell 26. FIG. 6a shows retaining post 70a in an installed position on turbine 26, with clip 78 of retaining post 70a secured onto turbine 26. Next, thrust washer 28 may be tilted or bent in an opposite direction 114 such that inclined surface 95 of clip 78 on retaining post 70b contacts radial outer edge 108 of hole 96 as retaining post 70b is pressed toward assembly surface 110. Once tip 97 of clip 78 of retaining post 70b contacts radial outer edge 108, tip 97 slides along radial outer edge 108 until clip is passed all the way through hole 96 and clip 78 snaps radially outward, such that axial contact surface 94 of retaining post 70b contacts axial surface 106 of plate portion 32 of turbine shell 26. FIG. 6a shows retaining post 70b in process of being installed on turbine 26, with clip 78 of retaining post 70b being pressed into hole 96 and tip 97 beginning to slide along radial edge 108.

Figure 6B:
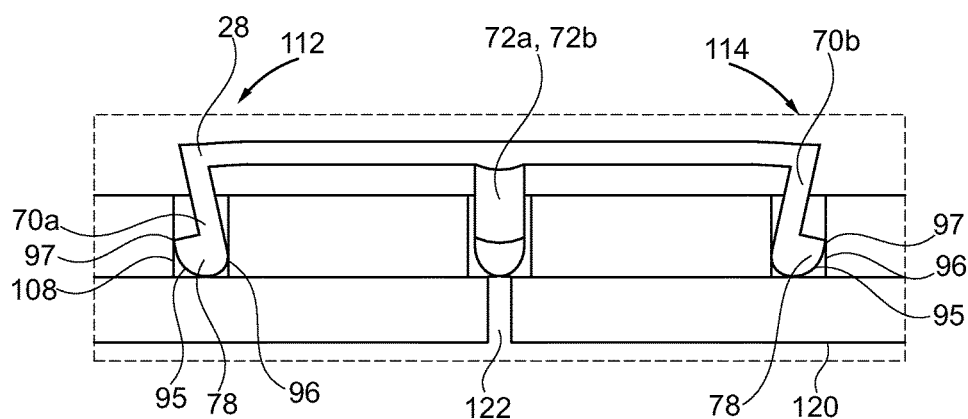
FIG. 6b schematically illustrates a method of connecting a thrust washer to a turbine in accordance with another embodiment of the present invention.

FIG. 6b schematically illustrates a method of connecting thrust washer 28 to turbine 26 in accordance with another embodiment of the present invention. In this embodiment, support posts 72a, 72b have a an axial length that is equal to or less than an axial length of retaining posts 70a, 70b, which may allow thrust washer 28 to be installed on turbine 26 using an assembly surface 120 having a protrusion 122, which may be an installation pin. Assembly surface 120 may be the surface of an installation tool or a fixture. In order to install thrust washer 28 on turbine 26, support posts 72a, 72b are pressed into holes 98 until contact surfaces 86 of support post 72a, 72b contact assembly surface 120, specifically protrusion 122. Retaining posts 70a, 70b of thrust washer 28 are then pivoted about contact surfaces 86 to allow retaining posts 70a, 70b to be installed into holes 96. Thrust washer 28 may be bent in directions 112, 114 at the same time such that inclined surfaces 95 of clips 78 on retaining posts 70a, 70b contact respective radial outer edges 108 of respective holes 96 at the same time, as retaining posts 70a, 70b are pressed toward assembly surface 120. Once tips 97 of clips 78 of retaining posts 70a, 70b contact respective radial outer edge 108, tips 97 slide along radial outer edges 108 until clips 78 are passed all the way through holes 96 and clips 78 snap radially outward, such that axial contact surfaces 94 of radial posts 70a, 70b contacts respective axial surfaces 106 of plate portion 32 of turbine shell 26. FIG. 6b shows retaining posts 70a, 70b in the process of being installed on turbine 26, with respective clips 78 of retaining posts 70a, 70b being pressed into holes 96 and tips 97 beginning to slide along respective radial edges 108. It should be noted that the installation described with respect to FIG. 6a using assembly surface 110 may be performed by bending thrust washer 28 in directions 112, 114 at the same time, as described with respect to FIG. 6b, and the installation described with respect to FIG. 6b using assembly surface 120 may be performed by bending thrust washer 28 in directions 112, 114 consecutively, as described with respect to FIG. 6a.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A turbine assembly for a torque converter comprising:
   a turbine including a plurality of holes; and
   a thrust washer connected to the turbine, the thrust washer including a bearing ring, at least one retaining post axially protruding from the bearing ring through at least one of the holes and at least one support post axially protruding from the bearing ring through at least one of the holes, the or each retaining post including an outwardly radially protruding clip securing the thrust washer onto the turbine, the at least one support post extending axially further from the bearing ring than the at least one retaining post.

2. The turbine assembly as recited in claim 1 wherein each of the at least one support and the at least one retaining post includes a base extending radially past an outer circumference of the bearing ring.

3. The turbine assembly as recited in claim 2 wherein the bases each include an axial surface coincident with an axial surface of the bearing ring in a radially extending plane.

4. The turbine assembly as recited in claim 1 wherein the at least one retaining post includes a first retaining post and a second retaining post, the at least one support post including a first support post and a second support post.

5. The turbine assembly as recited in claim 4 wherein in a circumferential direction, in sequence, the first support post follows the first retaining post, the second retaining post follows the first support post and the second support post follows the second retaining post.

6. The turbine assembly as recited in claim 5 wherein, in the circumferential direction, the first support post is spaced 90 degrees from the first retaining post, the second retaining post is spaced 90 degrees from the first support post and the second support post is spaced 90 degrees from the second retaining post.

7. The turbine assembly as recited in claim 4 wherein the holes in the turbine includes a first hole, a second hole, a third hole and a fourth hole, the first retaining post extending through the first hole, the first support post extending through the second hole, the second retaining post extending through the third hole and the second support post extending through the fourth hole.

8. The turbine assembly as recited in claim 7 wherein the first hole is in part defined by a first radial outer edge and the third hole is in part defined by a third radial outer edge, the first retaining post contacting the first radial outer edge, the second retaining post contacting the third radial edge, the bearing ring contacting a first axial surface of the turbine, the clips of the first and second retaining posts contacting a second axial surface of the turbine.

9. A torque converter comprising:
   the turbine assembly as recited in claim 1; and
   a cover assembly, the bearing ring being axially between the turbine and the cover assembly.

10. A method for forming a turbine assembly comprising:
    clipping a thrust washer onto a turbine, the thrust washer including a bearing ring, at least one retaining post axially protruding from the bearing ring and at least one support post axially protruding from the bearing ring, the or each retaining post including an outwardly radially protruding clip, the clipping including moving the at least one support post through corresponding holes in the turbine toward an assembly surface such that the at least one support post axially contacts the assembly surface while the at least one retaining post remains axially movable with respect to the assembly surface, then forcing the or each clip radially inward such that the or each clip clips the thrust washer onto the turbine, the at least one support post extending axially from the bearing ring a same distance or less than the at least one retaining post, the assembly surface including protrusions for contacting the at least one retaining post.

11. A method for forming a turbine assembly comprising:

clipping a thrust washer onto a turbine, the thrust washer including a bearing ring, at least one retaining post axially protruding from the bearing ring and at least one support post axially protruding from the bearing ring, the or each retaining post including an outwardly radially protruding clip, the clipping including moving the at least one support post through corresponding holes in the turbine toward an assembly surface such that the at least one support post axially contacts the assembly surface while the at least one retaining post remains axially movable with respect to the assembly surface, then forcing the or each clip radially inward such that the or each clip clips the thrust washer onto the turbine, the at least one retaining post including a first retaining post and a second retaining post, the at least one support post including a first support post and a second support post, the clipping including moving each of the first support post and the second support post through the corresponding holes in the turbine such that the first support post and the second support post contact the assembly surface while the first retaining post and the second retaining post are axially movable with respect to the assembly surface, then pivoting the at least one retaining post about the first support post and the second support post while the first support post and the second support post contact the assembly surface such the clips are forced radially inward until the clips pass through the corresponding holes and extend radially outward to clip the thrust washer onto the turbine.

12. The method as recited in claim 10 wherein the at least one retaining post includes a first retaining post and a second retaining post, the at least one support post including a first support post and a second support post, the clipping including moving each of the first support post and the second support post through the corresponding holes in the turbine such that the first support post and the second support post contact the assembly surface while the first retaining post and the second retaining post are axially movable with respect to the assembly surface, then pivoting the at least one retaining post about the first support post and the second support post while the first support post and the second support post contact the assembly surface such the clips are forced radially inward until the clips pass through the corresponding holes and extend radially outward to clip the thrust washer onto the turbine.

13. The method as recited in claim 10 wherein each of the at least one support and the at least one retaining post includes a base extending radially past an outer circumference of the bearing ring, the or each clip extending radially outward past the corresponding base.

14. The method as recited in claim 13 wherein the or each clip is pressed radially inward during the clipping.

15. The method as recited in claim 14 wherein the holes are each in part defined by a radial outer edge, the or each clip being forced inward to slide along the corresponding radial outer edge during the clipping until the or each clip extends radially outward to contact an axial surface of the turbine and clip the thrust washer on the turbine.

16. The method as recited in claim 11 wherein the at least one support post extends axially further from the bearing ring than the at least one retaining post.

\* \* \* \* \*